United States Patent [19]
Croft

[11] Patent Number: 5,893,459
[45] Date of Patent: Apr. 13, 1999

[54] CLEAR PLASTIC PACKAGE

[75] Inventor: Douglas E. Croft, Glenview, Ill.

[73] Assignee: Modern Aids, Inc., Elk Grove Village, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/799,321

[22] Filed: Feb. 13, 1997

Related U.S. Application Data

[62] Division of application No. 08/533,249, Sep. 25, 1995, Pat. No. 5,636,497.

[51] Int. Cl.$^6$ ................................................. B65D 73/00
[52] U.S. Cl. ........................... 206/460; 206/778; 206/806
[58] Field of Search ................................. 206/460, 461, 206/466, 468, 470, 775, 776, 778, 806, 69, 769, 770, 771, 469

[56] References Cited

U.S. PATENT DOCUMENTS

| | | |
|---|---|---|
| 1,387,839 | 8/1921 | Davis . |
| 2,712,208 | 7/1955 | Campbell . |
| 2,737,764 | 3/1956 | Lewis . |
| 3,202,278 | 8/1965 | Taylor . |
| 3,450,256 | 6/1969 | Chandler et al. ........................ 206/461 |
| 3,481,101 | 12/1969 | Steadman . |
| 3,523,397 | 8/1970 | Carey et al. . |
| 3,660,962 | 5/1972 | Bliss et al. . |
| 3,843,326 | 10/1974 | Lichtenstenen . |
| 4,219,987 | 9/1980 | Hannon . |
| 5,184,724 | 2/1993 | Mayled ..................................... 206/46 |
| 5,297,679 | 3/1994 | Rondone et al. .................... 206/467 X |

*Primary Examiner*—Jacob K. Ackun
*Attorney, Agent, or Firm*—Hill & Simpson

[57] ABSTRACT

The present invention provides a sturdy display package which, in an embodiment, is made of first and second peripherally sealed transparent PVC sheets approximately 7.5 mils thick each. The package is particularly useful for displaying and protecting small items such as pain reliever packets or condoms. The invention includes a method and apparatus for making such a package. The first sheet is positioned over a nesting plate having a plurality of nesting modules, each corresponding to one package and being independently height-adjustable by a shim at a selected location to correct sealing flaws. The second sheet is then positioned over the first sheet so that the items are between the sheets. An RF-sealing die is provided having package-shaped sealing dies, each defining a pocket. The sealing die and nesting plate are pressed together so that each pocket receives a bulge formed by from one of the items. Each pocket has a foam insert which resiliently deforms and presses the second plastic sheet peripherally around the item. The RF sealing die nests against the nesting plate forming a plurality of seal areas, each enclosing one of the items and defining one package. The individual packages may then be cut from a resulting composite sheet.

2 Claims, 8 Drawing Sheets

CLEAR PLASTIC PACKAGE

This is a division of application Ser. No. 08/533,249, filed Sep. 25, 1995, now U.S. Pat. No. 5,636,497.

BACKGROUND OF THE INVENTION

The present invention generally relates to packaging. More particularly, the present invention relates to packaging a product between sealed plastic sheets.

Some small products are packaged in a single-unit quantity to be sold and dispensed individually. For example, aspirin, pain relievers, and antacids are commonly sold in two-tablet, single dose product packets. Similarly, condoms and other products are sometimes sold in individual product packets.

One type of conventional display for such packaged products consists of a cardboard stand on which an array of the individual packets are secured, such as by stapling. A consumer or store clerk tears each individual product packet from the display as it is needed. These product packets are typically made of paper, plastic, or foil-backed paper sheets, but may be made of other materials also.

Such conventional display systems have several disadvantages. For instance, the product packets are openly exposed and can become shopworn. This is a particular problem where the product has a slow turnover rate. Specifically, the packet material becomes scuffed, dogeared and unappealing to a consumer. Also, when a package is stapled to the display board, the package tears when removed. When the package becomes worn or damaged, a consumer might perceive the product as being unsanitary, decreasing its sales appeal. Therefore, a means for protecting an individual small packet is desirable. It is further desirable to provide a protective package for individually-dispensed products which can be attractively displayed, which is not necessarily damaged by removal from the display.

Another disadvantage to small product packets is that they typically have no room for a bar code symbol. Attachment of a custom bar code label is often desirable for individual merchants to automate the checkout process. A need exists for a package for displaying a small packet, wherein the package can display a bar code label.

A conventional package for displaying small items is a blister-type package formed from thermoplastic. In such a package, the thermoplastic is permanently molded, forming a cavity to accommodate an item. Unfortunately, deformed visibility through such packaging is characteristic. Therefore, it is desirable to provide a display package for small items which has little visual deformation.

Packages are known which are made of two flexible plastic sheets. However, such conventional packaging does not seal well. Furthermore, such packages lack a desired sturdiness for protecting contents and for ease of display. Therefore, a relatively sturdy package is desirable which is well sealed.

SUMMARY OF THE INVENTION

The present invention provides an improved method of making a package. The resulting packages are formed of flexibly rigid, transparent plastic sheets. The sheets generally contour over the item, but are not molded or permanently deformed as in a blister-type package. In a preferred embodiment, the sheets are 7.5 mils thick transparent PVC plastic, and are peripherally sealed to enclose a product therein. Previous transparent sheet packages have been inadequately sealed or undesirably flimsy. To this end, the present invention provides a package which is flexibly rigid and method of making such a package with adequate sealing.

The method of packaging includes providing a first plastic sheet. A plurality of items (e.g., individual dose pain reliever packets, individual condom packets, etc.) are positionally secured to the first plastic sheet, such as with an adhesive. The first or lower plastic sheet is placed on a nesting plate. A second or upper plastic sheet is placed over the first plastic sheet so that the items are disposed therebetween. A sealing die is then lowered onto the second plastic sheet to form a plurality of seal areas between the first and second plastic sheets so that each item being enclosed in a pouch or package defined by one of the seal areas. The peripheral seal area of each package surrounds the item therein so that the sheets are non-permanently deflected over the item.

In an embodiment, the method also includes activating the sealing die with RF vibration during the lowering step. The RF vibration results in a welding together of the two sheets, forming the seal areas.

In an embodiment, the method also includes placing a layer of dielectric material between the nesting plate and the first sheet to prevent arcing of the RF energy.

In an embodiment, the sealing die includes a plurality of sealing pockets defined by a sealing edge or wall. Each sealing pocket contains a foam insert defining a hollow or recess so that the foam insert is shaped to peripherally contact around the item. The nesting plate includes a plurality of nesting areas, each nesting area having a pocket. In a preferred embodiment, each lower nesting area is defined by a module. These modules may be individually shimmed for adjusting the sealing operation. The method thus also includes pressing each foam container pocket and corresponding lower nesting pocket oppositely against one of the items during the lowering step. Each foam area resiliently deforms to press peripherally around the item as the respective die presses the first and second sheets against the nesting plate. This insures proper pressure and tension across the sheets during sealing. Furthermore, after the sealing die is retracted, the foam momentarily holds the molten plastic of the sealed sheets together long enough to sufficiently harden.

In an embodiment, the sealing die and nesting plates may include at least one hole-punch, preferably having two. Where such a dual hole-punch is provided, the lowering step includes punching two positioning holes through the first and second sheets at a predetermined location. After the sheets are removed from the dies, each hole is placed on a corresponding locating post on a cutting apparatus. The cutting apparatus is then used to free each pouch by cutting along the seal areas, separating the individual pouches or packages.

In an embodiment, the sealing die has corresponding cutting edges positioned around each seal area. The method further includes cutting along the seal areas with the cutting edges to free each package.

In an embodiment, the method includes forming an additional seal area defining a hanger hole within the seal area which defines each package. Portions of the plastic sheets may be cut away within the hanger hole seal areas. These hanger holes are used for hanging each individual package on a display hanger.

The present invention also provides an improved package made of rigid material which is reliably sealed. To this end, in an embodiment, a package is provided having a front sheet and a back sheet. The back sheet is sealed along peripheral edges to the front sheet to form an enclosed pouch. Both sheets are made of transparent PVC plastic approximately 7.5 mils thick. In an embodiment, a hanger hole is disposed through the front and back sheets. The front and back sheets are peripherally sealed around the hanger hole. The package preferably includes at least one notch in its side for easy opening.

An advantage of the present invention is to provide an improved method of forming a package.

Another advantage of the present invention is to provide an apparatus for making a plurality of sealed packages, wherein the sealing pressure can be selectively adjusted at a particular location of an individual package.

A further advantage of the present invention is to provide a method of reliably sealing an item, such as an individually packaged small product, within a durable, transparent, displayable package. A related advantage is to provide a package which protects small packets while they are displayed. Protecting such a packet from shopwear lengthens its commercial sales appeal and sanitary appearance.

An additional advantage of the present invention is to provide a method of forming a plurality of packages from a pair of plastic sheets.

A still further advantage of the present invention is to form plastic packages without a separate manufacturing step of preforming blisters.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
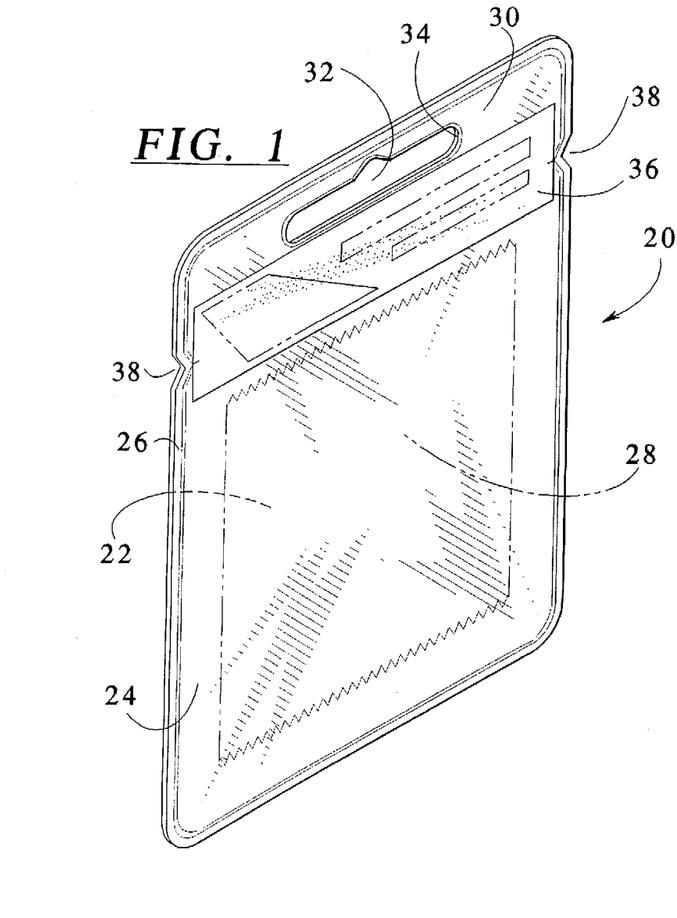
FIG. 1 is a perspective view of a package formed by the method according to the present invention.
Figure 2:
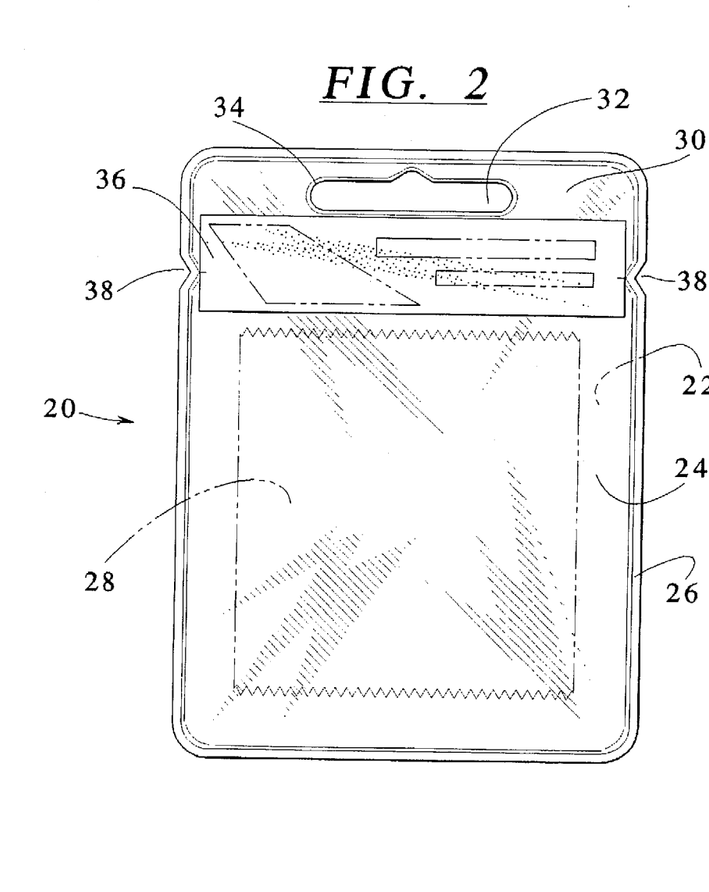
FIG. 2 is a front elevational view of the package of FIG. 1.
Figures 3, 4, 5:
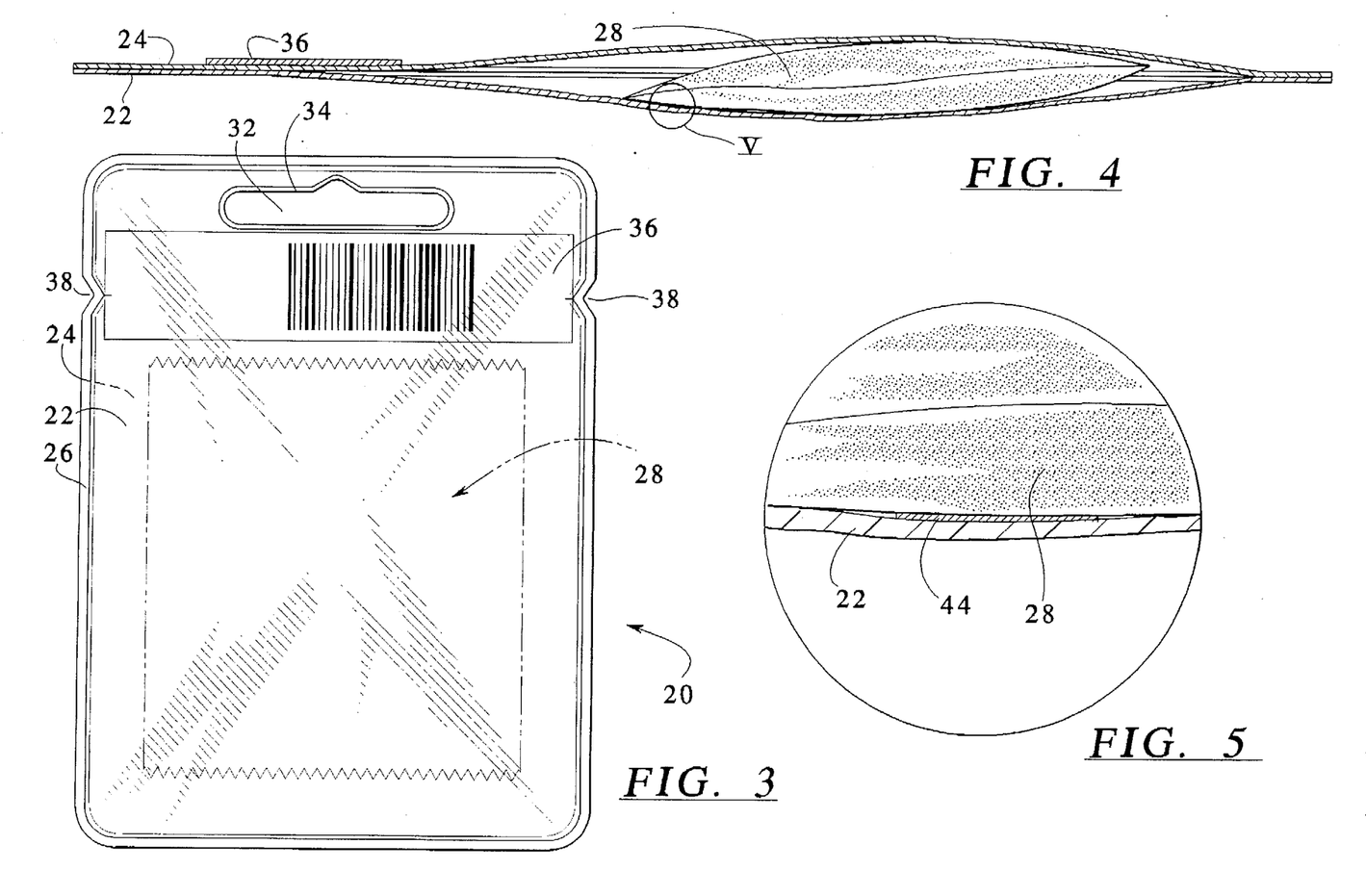
FIG. 3 is a rear elevational view of the package of FIG. 1.
FIG. 4 is a sectional view of the package taken generally along line IV—IV of FIG. 2.
FIG. 5 is an enlarged view of section V of FIG. 4.

FIGS. 1–3 illustrate one possible embodiment of a package 20 formed according to the present invention. The package 20 is formed of a back sheet or first sheet 22 and a front sheet or second sheet 24. The first sheet 22 and second sheet 24 are secured together by a seal area 26 around an adjacent periphery of the package 20. An item 28 is enclosed generally centrally within the package between the first and second sheets, 22 and 24. The item 28 can be a commercial product packet such as an individual-dose pain reliever packet, a condom packet, an antacid packet, or the like.

The package 20 generally has a top portion 30 with a hanger hole 32 formed therein. In an embodiment, the hanger hole 32 is also formed by a seal area 34 around its periphery. In another embodiment, the hanger hole 32 is formed by an unsealed opening through the sheets 22 and 24 in which case, if desired, a seal line may be positioned transversely across the package below the hanger hole to maintain the product in a sealed area. The hanger hole 32 can be used to hang the package 20 on a peg of a display stand (not shown) displaying multiple packages 20 for commercial sale. The package 20 can have a label 36 secured to the front second sheet 24 to display a trademark or commercial message. As shown in FIG. 3, the label 36 can have a bar code symbol on the rear which is readable through the sheets 22 and 24.

The top portion 30, in one embodiment, is defined by a pair of notches 38 disposed oppositely in sides of the package 20. The top portion 30 can be torn off, notch-to-notch, to allow the item 28 to be removed. In general, only one notch is needed, however, a second notch may be provided for a balanced look. In a preferred embodiment, the peripheral seal area 26 is generally 1/8 inch thick around the package 20, however, the seal area is slightly thinner, e.g., 1/32 inch thinner, at each notch 38. The thinner seal area 26 at the notch 38 allows the top portion 30 to be torn off easier.

The plastic sheets 22 and 24 are resiliently rigid in the sense that they are somewhat stiff but are also flexible. The sheets 22 and 24 are preferably made of transparent PVC plastic, approximately 7.5 mils thick. Such a material provides the package 20 with its flexibly rigid character. This rigidity allows the package 20 to be easily handled and displayed. The package 20 is formed such that the sheets 22 and 24 are deflected outwardly to accommodate a bulge formed by the item 28, and such that this deflection is a non-permanent deformation. The sheets 22 and 24 generally contour over the item 28, but are not molded or permanently deformed as in a blister-type package.

Figure 6:
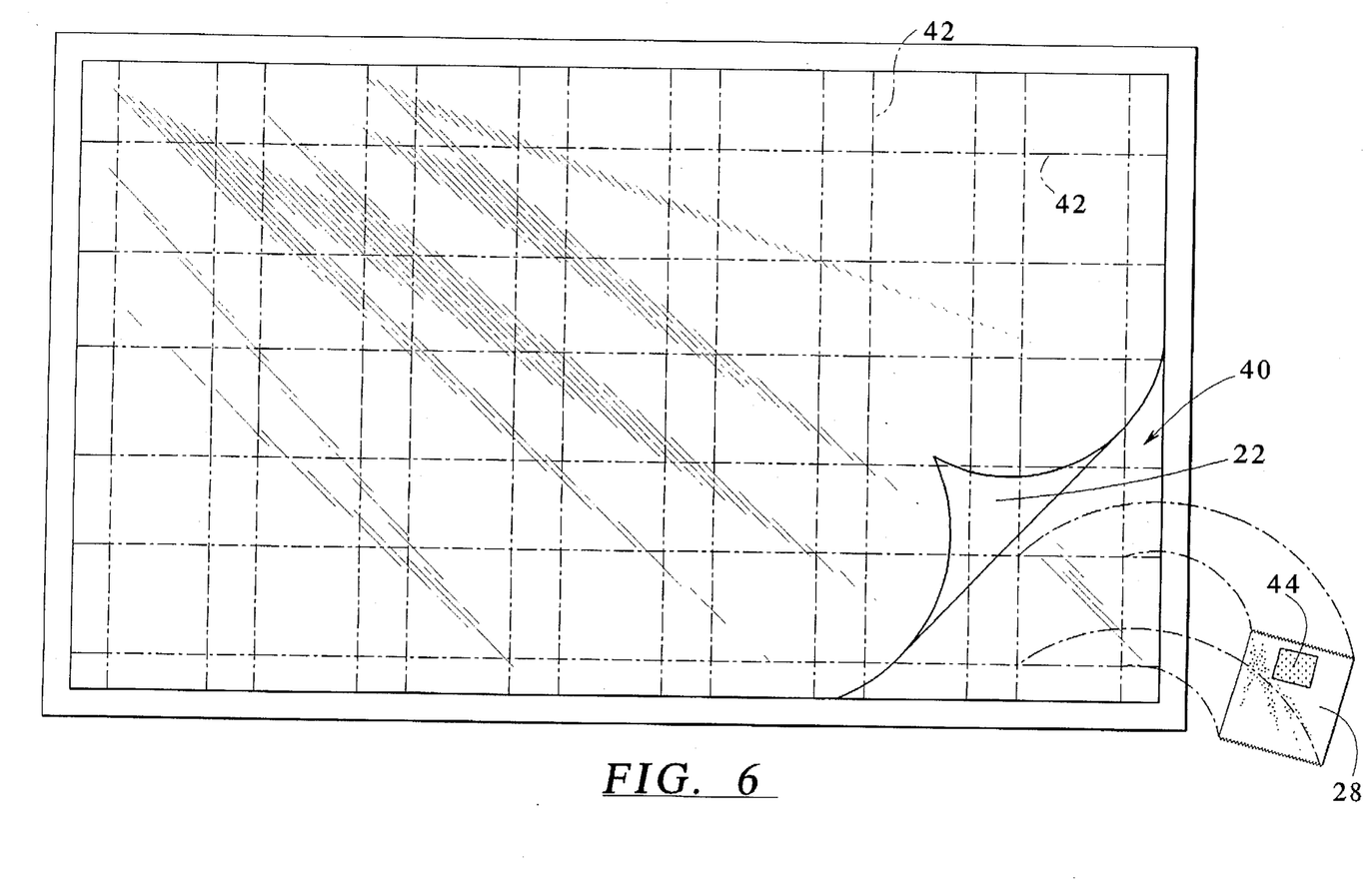
FIG. 6 is plan view of a positioning grid and the first or lower sheet according to the present invention.
Figure 12:
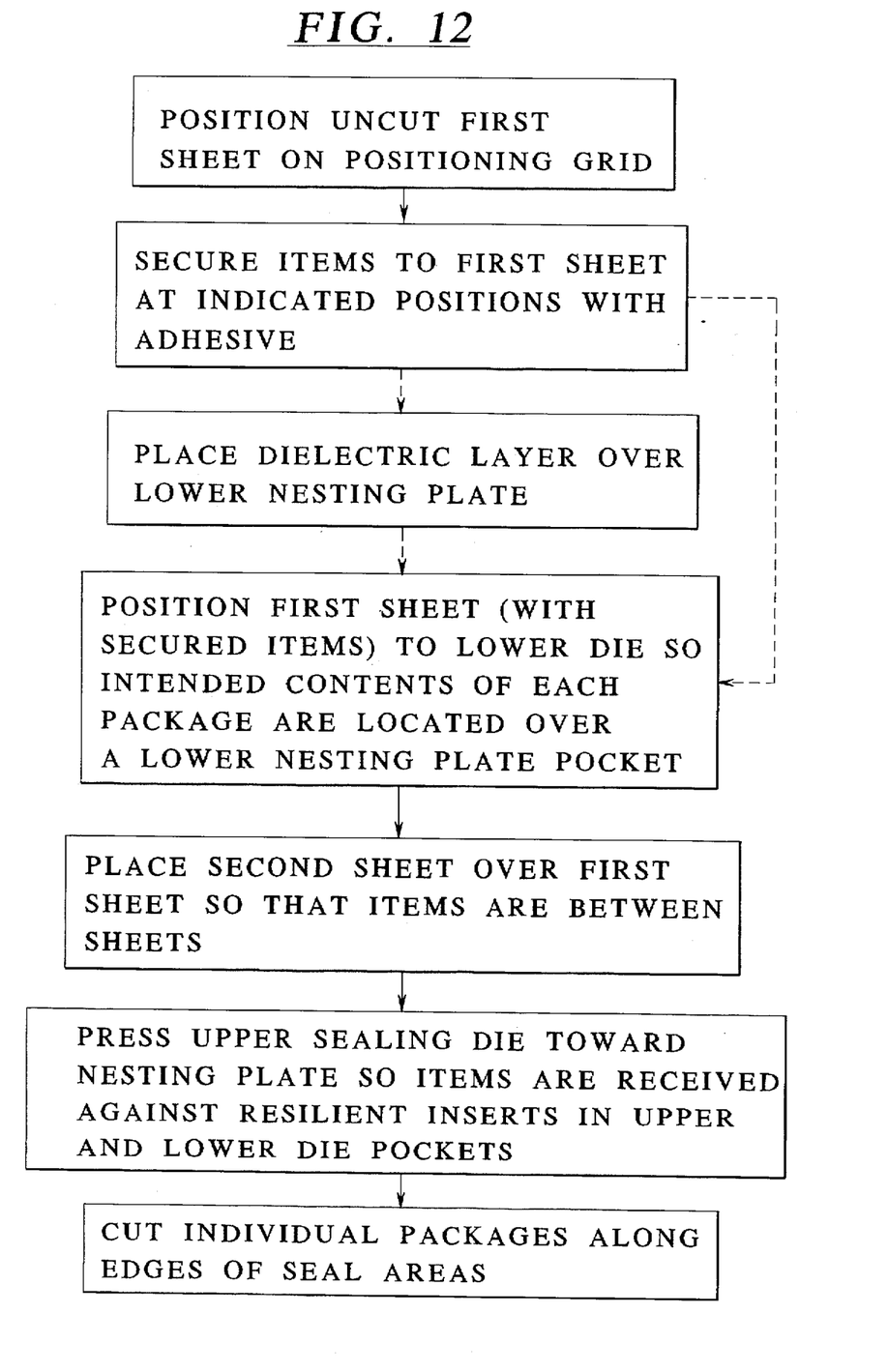
FIG. 12 is a flow chart outlining steps for manufacturing a package according to the present invention.

The present invention provides a method of forming one or more of these rigid plastic packages 20. FIG. 12 presents a flow chart generally outlining steps of the method. The method includes securing the items 28 to be packaged on the first sheet 22 while the first sheet 22 is in a large uncut form. As illustrated in FIG. 6, the first sheet 22, in a continuous, rectangular, uncut form is laid flatly on a positioning grid 40, aligning the first sheet 22 with the grid 40. In the illustrated embodiment, the positioning grid 40 has a series of lines 42 which indicate desired positions for the items 28. Suitable position indicators other than lines could include dots, silhouettes, or other markings.

Each item 28 is secured to the first sheet 22 in its proper position by an adhesive 44. In an embodiment, the adhesive 44 is a double sided tape, however, any suitable adhesive can be used. This secures the items 28 in relative positions adequately spaced from one another to seal the individual items 28 in a manner described below.

Figure 7:
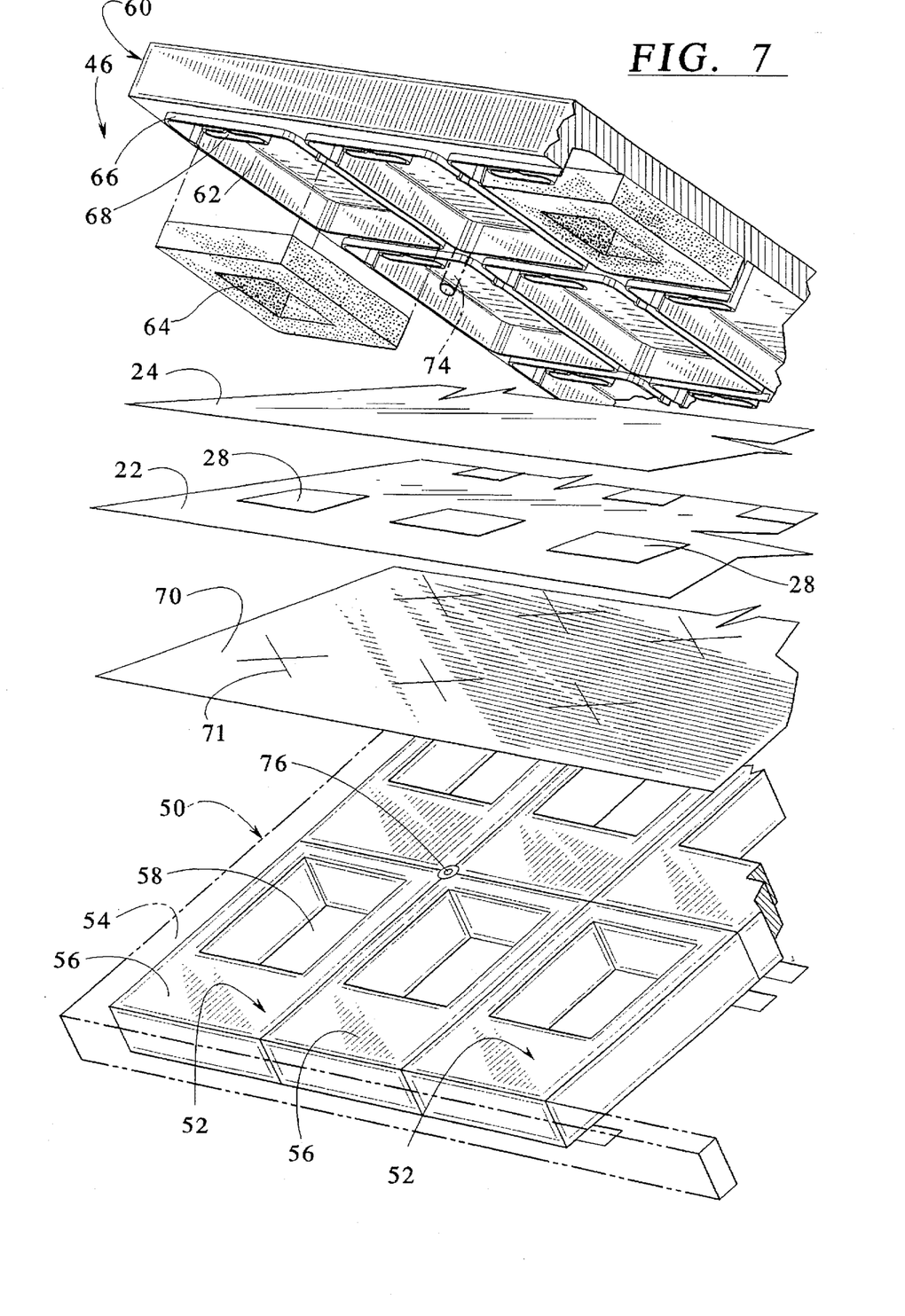
FIG. 7 is an exploded view of the sealing die and nesting plate, illustrating the first and second sheets, product items being packaged, and dielectric sheet according to an embodiment of the present invention.

Turning to FIG. 7, a sealing apparatus 46 is shown. The sealing apparatus 46 includes a nesting plate 50 and an opposed sealing die 60. The sealing die 60 has a plurality of peripheral projecting ribs or edges 66, each defining a pocket. Also, in an embodiment, each sealing pocket 62 has an upper projecting wall 68 in the desired shape of the hanger hole 32. This rib or edge may be formed by a metal member, such as brass, which is bolted onto a backplate. The nesting surface of each lower nesting module is sized to receive the edge 66 and wall 68 flatly thereagainst. Each pocket 62 is generally in the shape of the ultimately desired package 20. Furthermore, each pocket 62 is occupied by a resilient piece of foam or foam insert 64. The foam inserts 64 generally occupy a periphery around the space where the item 28 is to be positioned in the package 20.

The nesting plate 50 includes a plurality of nesting modules 52 arranged adjacently to each other so that each module 52 corresponds in position to an opposing pocket 62 of the sealing die 60. The nesting modules are held in position by fixed frame members 54. Each nesting module 52 forms a flat nesting surface 56 for supporting a sealing pressure from the sealing edges 66, 68 of the sealing die 60. Also, each nesting module 52 has a central recess 58, generally at least the size of the item being packaged. The recess may be a hole through the module 52. The sealing die 50 and nesting plate 60 are relatively moveable toward and away from each other so that each module 52 oppositely presses against a corresponding pocket 62 of the sealing die 60.

Still referring to FIG. 7, a dielectric layer 70 made of dielectric material is optionally placed over the nesting plate 50. The uncut first sheet 22 having the adhesively positioned items 28 is then squarely positioned on the nesting plate 50 over the dielectric layer 70 so that each item 28 is generally centrally positioned over the a respective one of the recesses. The dielectric layer 70 prevents static attraction between the first sheet 22 and the nesting plate 50. The upper or second sheet 24, in a large, uncut, rectangular and continuous form, is placed over the first sheet 22 so that the items 28 are positioned between the first and second sheets 22 and 24.

Figures 8, 9:
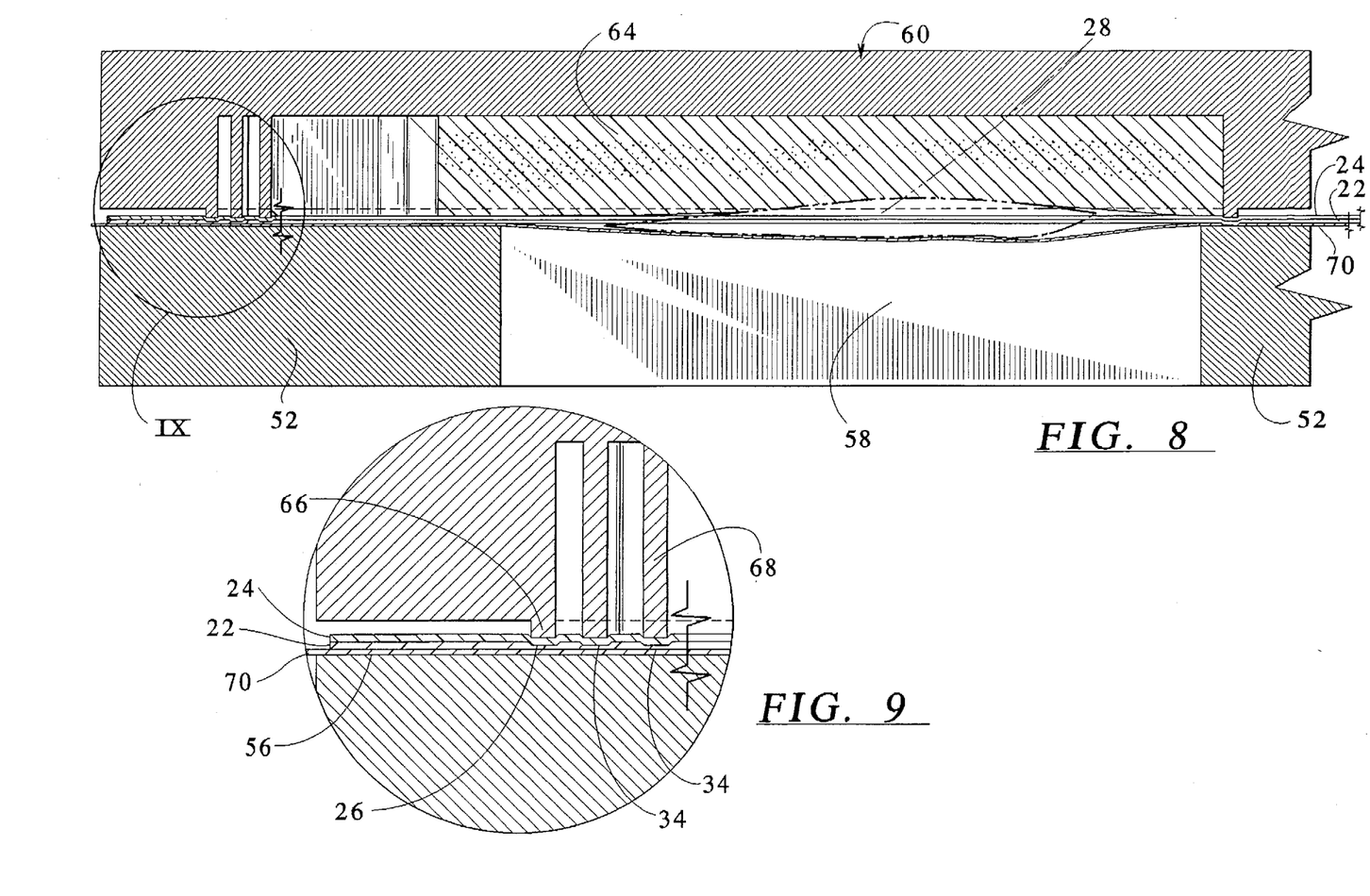
FIG. 8 is a sectional view illustrating a pouch being pressed between an upper sealing die and a corresponding lower nesting module.
FIG. 9 is an enlarged view of section IX of FIG. 8.

As illustrated in FIGS. 8 and 9, the sealing die 60 is moved downward onto the upper, second sheet 24 so that the first and second sheets 22 and 24 are pressed in contact together between the projecting peripheral edge 66 of the sealing die 60 and the nesting areas of the nesting plate 50. The sealing die 60 is activated with RF vibration, causing the first and second sheets 22 and 24 to weld or fuse together, forming the seal area 26 along a peripheral package border and, in an embodiment, forming the seal area 34 defining the hanger hole 32.

During the sealing together of the sheets 22 and 24, only the seal areas 26 and 34 at the periphery and the hanger hole are affected permanently. In other words, the sheets 22 and 24 are not otherwise permanently deformed or molded. The sheets 22 and 24, being rigidly flexible, non-permanently deflect to accommodate and generally contour over the item 28 within the package 20.

Also shown in FIGS. 8 and 9, each resilient insert 64 resiliently deforms to press against the plastic sheet 24 peripherally around the item 28 so that the upper and lower sheets 22, 24 are held against each other with a proper tension during the sealing operation. Each corresponding recess 52 and pocket 62 combination is dimensioned to have a combined depth great enough to accommodate the package thickness, including the item 28. The dielectric layer 70 preferably has a plurality of X-shaped slits 71, each being positioned generally at one of the items 28. The slits 71 provide adequate deflection of the dielectric layer 70 during pressing so that the layer 70 or the item 28 are not damaged.

In one possible embodiment, the upper sealing pockets 62 are provided without the opposed recesses 58 in the nesting plate 50, in which case each pocket 62 must alone be deep enough to accommodate the entire thickness of the package and item.

Figure 10:
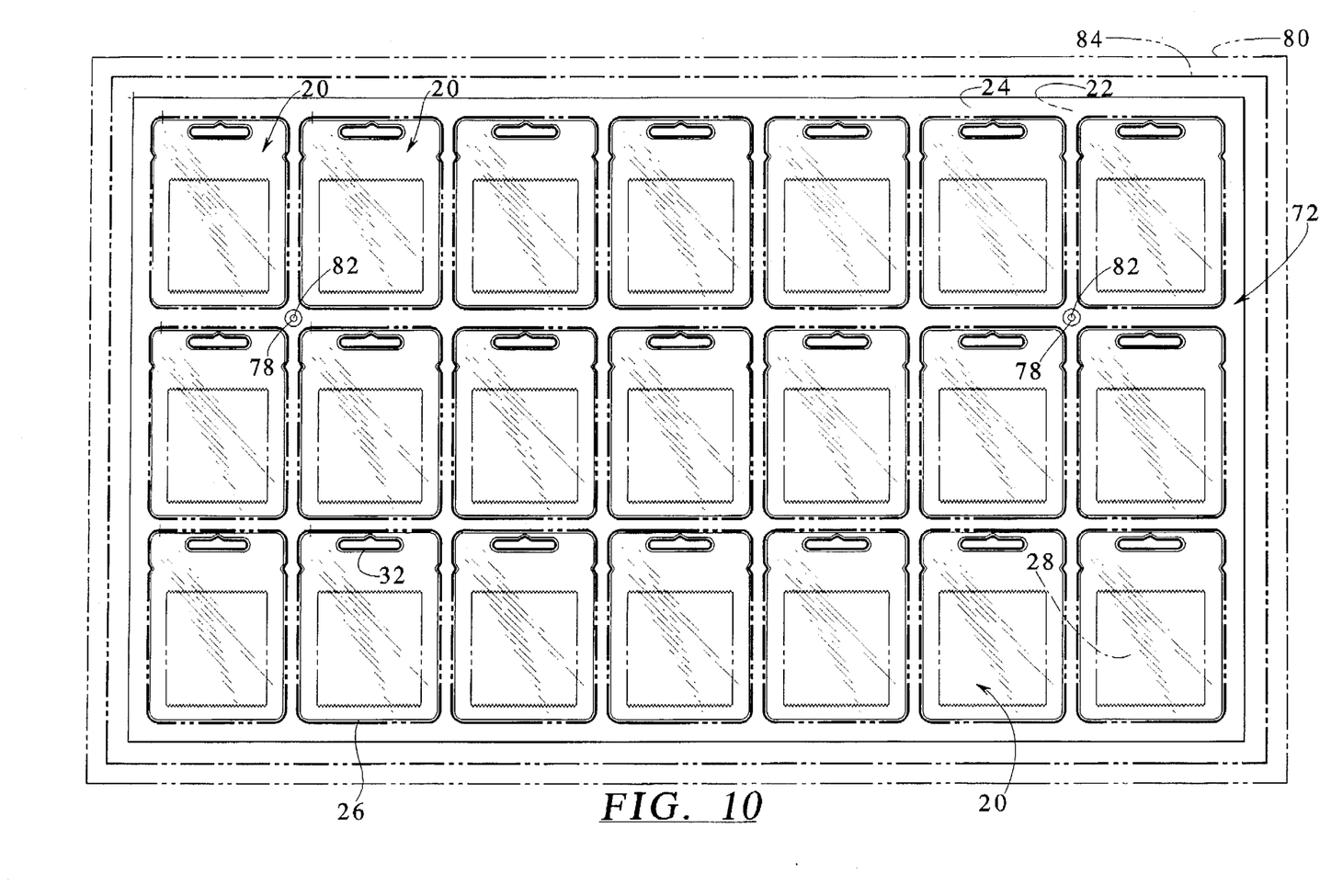
FIG. 10 is a front elevational view of a plurality of sealed packages formed according to the present invention, the individual packages being defined by peripheral cut lines shown in phantom.

The sealing die 60 is then retracted, revealing a composite sheet 72 of multiple sealed packages 20 formed by sealing the sheets 22 and 24 together, as illustrated in FIG. 10. The composite sheet 72 is removed from the nesting plate 50. In FIG. 10, the seal areas 26 and 32 are shown, defining the shapes of the multiple individual packages 20, each package 20 containing one of the packaged items 28 therein. After the sealing die 60 is retracted, the resilient foam inserts 64 return to their normal shapes. In the embodiment illustrated in FIG. 10, the composite sheet 72 is arranged on a cutting board 80 which is associated with an overhead cutting press 84, these elements being described in greater detail below with reference to FIG. 11. As shown in FIG. 10, each package 20 is peripherally defined by a cut line (illustrated in phantom).

The individual nesting modules of the nesting plate 50 provide advantageous adjustability in a manufacturing application. More particularly, referring to FIG. 10, it is possible that one of the seal areas 26 or 32 might become weak due to a non-uniform pressure of the sealing die edges against the sheets, in turn supported by the nesting plate. To correct this, the sealing pressures can be fine-tuned at any location of the sheet 72 by applying a shim 48, such as a piece of shim tape, under a module 52 at a place where additional pressure is needed. This adjustability permits the mass manufacture of packages 20 having adequate, uniform seal areas 26, 32. The shim 48 is usually around 7–15 thousandths of an inch thick, however, any thickness necessary may be used.

In a mass-production arrangement (not shown), a turntable or other movable device, can be provided having multiple nesting plates 50, and in a preferred such embodiment, four nesting plates 50 are provided. The sheets can be arranged, as described above with reference to FIG. 7, on one of the nesting plates 50 when the nesting plate 50 is in a position away from the sealing die 60. Then, the turntable can be turned to an operable position to receive the sealing die 60, which seals the first and second sheets 22 and 24. When the sealing die 60 is lifted, the turntable is then rotated so that the nesting plate 50 moves away for easy removal of the sealed composite sheet 72 and positioning another nesting plate under the sealing die.

The individual packages 20 are separated from the composite sheet 72 by one or more cutting steps. To this end, in an embodiment, the sealing die 60 includes two hole punches 74 extending downwardly between sealing pockets 62. The nesting plate 50 includes a corresponding die hole 76 for each hole punch 74. When the sealing die 60 and nesting plate 50 are brought together, each punch 74 is inserted into its associated die hole 76, forming a positioning hole 78 in the composite sheet 72, as shown in FIG. 10. It should be noted that any number of positioning holes 78 may be made, although two are preferred.

Figure 11:
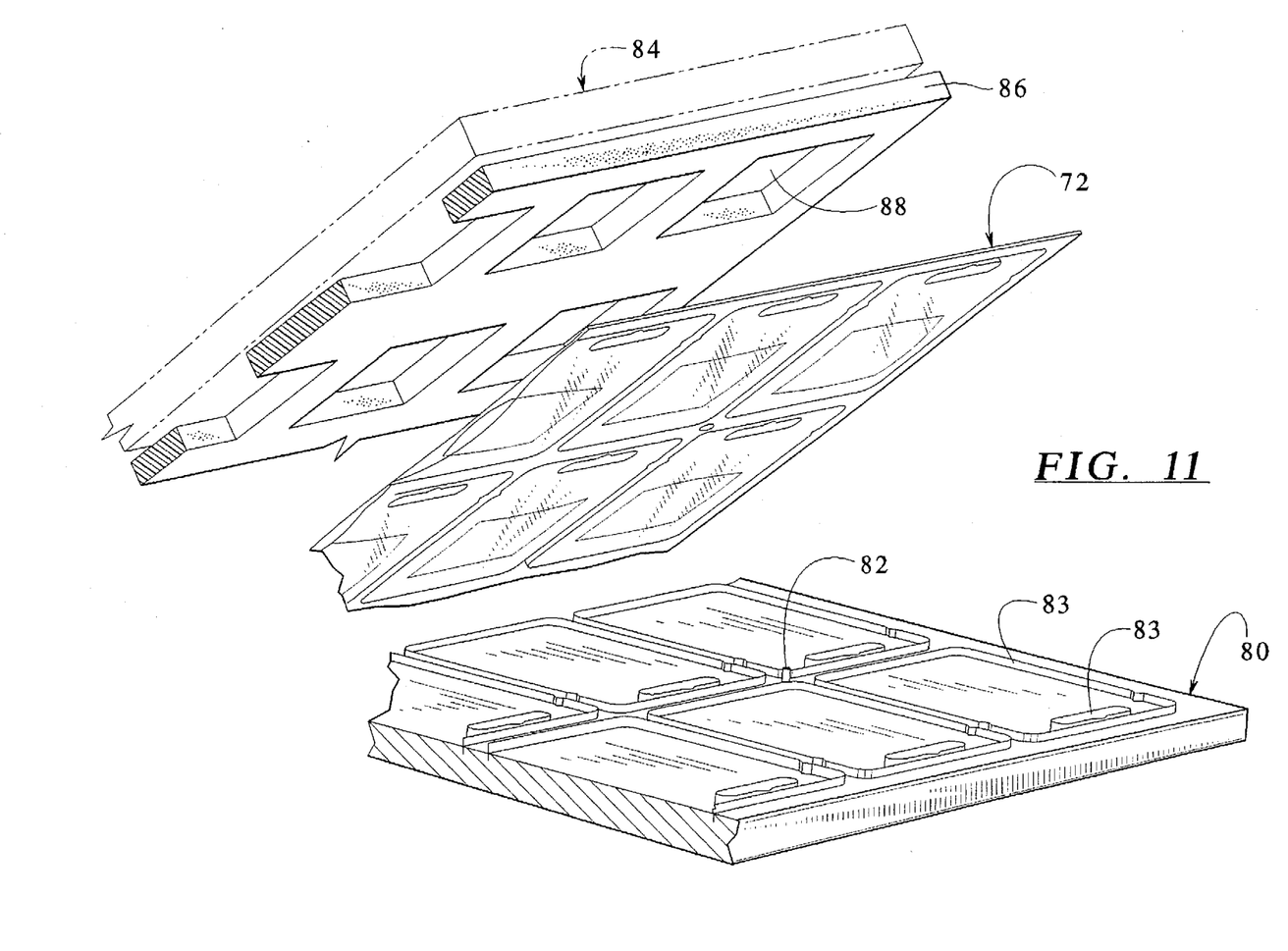
FIG. 11 is a partial perspective view of a cutting press and cutting board.

The composite sheet 72 is then positioned on the cutting board 80 of a cutting apparatus, as illustrated in FIG. 11. The cutting board 80 illustrated includes cutting blades 83 corresponding to the desired package shape. Proper positioning is accomplished by placing each positioning hole 78 on a cooperatively shaped positioning peg 82 extending upwardly from the cutting board 80. A rigid pad 86 is then placed atop the composite sheet 72. The rigid pad 86 has a plurality of cutouts 88 corresponding to locations of the items 28. The pad may be made of polypropylene. The press 84 is then brought down against the pad, pressing the composite sheet 72 against the cutting blades 83. The cutouts 88 prevent contact pressure of the press 84 against the items 28 so that the items 28 are not damaged.

As illustrated, the cutting blades are configured to cut through the first and second sheets 22 and 24 along an outer border of each peripheral seal area 26 and simultaneously along an inner border of each hanger hole 32. The peripheral cuts are shown in phantom in FIG. 10, and the retainer hole cuts are shown in bold. This separates each package 20 from the remainder of the composite sheet. If desired, the cutting step can be partially executed so that the composite sheet 72 retains an integral shape, but is weakened so that each package 20 can be easily separated by hand. Moreover, the cutting operation may be performed in two stages—cutting only the retainer holes and then cutting the package edges. Separate cutting boards may be provided for each stage, one having only retainer hole cutting edges and the other having only package-periphery cutting edges. Such a two-stage cutting operation may be desirable if the press 84 is not powerful enough for a single-stage cutting operation.

Optionally, instead of the separate cutting apparatus described above, in another embodiment, the cutting step can be performed simultaneously with the sealing step performed by the sealing die and nesting plate including a nested cutter type arrangement. To this end, the sealing die may be provided with cutting edges (not shown) positioned to cut the sheets at the locations previously described.

Referring to FIGS. 5 and 6, each adhesive 44 contacts only a portion of the associated item 28 and is positioned on the item 28 preferably toward (but not in) the top of the package. This positioning of the adhesive 44 makes the item 28 easier to remove from the package 28 after opening. Also, the item 28 is preferably arranged in the package 20 below the two notches 38. Such a position within the package 20 keeps the item 28 from tearing as the package 20 is torn open from notch-to-notch and ensures that the item does not block the bar code label. Moreover, the adhesive 44 holds the item 28 at a generally central position in the package 20, providing an attractive, organized appearance.

It should be understood that various changes and modifications to the presently preferred embodiments will be apparent to those skilled in the art. For example, the package 20 could be some shape other than that shown in the Figures, and the sealing apparatus may be configured to seal more or fewer packages 20 at one time. Moreover, multiple items 28 could be contained in a single package 20. Such changes and modifications may be made without departing from the spirit and scope of the present invention and without diminishing its attendant advantages. Therefore, such changes and modifications are intended to be within the scope of the appended claims.

What is claimed is:

1. A package containing an item, the package comprising:

a front sheet and a back sheet having peripheral edges in matching registry, both sheets being made of transparent PVC plastic approximately 7.5 mils thick;

a hanger hole disposed through said front and back sheets, said front and back sheets being peripherally sealed around said hanger hole;

at least one notch in said peripheral edges; and an adhesive securing the item at a predetermined position against the back sheet;

wherein the front and back sheets are sealed together along the peripheral edges to form an enclosed pouch within which the item resides, the front and back sheets each non-permanently deflecting outwardly to accommodate the item therebetween.

2. The package according to claim 1, wherein the front and back sheets are sealed together by a non-resealable seal along the peripheral edges to form the enclosed pouch.

* * * * *